(12) United States Patent
Satam et al.

(10) Patent No.: US 9,417,886 B2
(45) Date of Patent: Aug. 16, 2016

(54) SYSTEM AND METHOD FOR DYNAMICALLY CHANGING SYSTEM BEHAVIOR BY MODIFYING BOOT CONFIGURATION DATA AND REGISTRY ENTRIES

(71) Applicant: Dell Products, LP, Round Rock, TX (US)

(72) Inventors: Aditi R. Satam, Round Rock, TX (US); Gangadhar D. Bhat, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 599 days.

(21) Appl. No.: 13/746,052

(22) Filed: Jan. 21, 2013

(65) Prior Publication Data

US 2014/0208089 A1    Jul. 24, 2014

(51) Int. Cl.
  *G06F 15/177*    (2006.01)
  *G06F 9/00*      (2006.01)
  *G06F 9/44*      (2006.01)
  *G06F 9/445*     (2006.01)

(52) U.S. Cl.
  CPC .......... *G06F 9/4406* (2013.01); *G06F 9/44505* (2013.01)

(58) Field of Classification Search
  CPC .................................................... G06F 9/4406
  USPC ............................................................ 713/2
  See application file for complete search history.

(56) References Cited

U.S. PATENT DOCUMENTS

| | | | |
|---|---|---|---|
| 6,219,828 B1* | 4/2001 | Lee | G06F 9/4401 711/102 |
| 6,691,253 B1 | 2/2004 | Gillenater et al. | |
| 7,225,327 B1* | 5/2007 | Rasmussen et al. | 713/2 |
| 7,770,073 B2 | 8/2010 | Faschik et al. | |
| 8,239,839 B2 | 8/2012 | Rossmann et al. | |
| 2001/0005852 A1 | 6/2001 | Bogle et al. | |
| 2006/0150183 A1* | 7/2006 | Chinya et al. | 718/100 |
| 2010/0057865 A1 | 3/2010 | Chan et al. | |
| 2011/0185353 A1* | 7/2011 | Matthew | G06F 8/61 717/178 |
| 2011/0238969 A1* | 9/2011 | Warkentin et al. | 713/2 |
| 2012/0216028 A1* | 8/2012 | Amini et al. | 713/100 |

* cited by examiner

Primary Examiner — Robert Cassity
(74) Attorney, Agent, or Firm — Larson Newman, LLP

(57) ABSTRACT

A method includes booting an information handling system, starting a BIOS on the information handling system, storing configuration information for the information handling system, retrieving, by an operating system (OS) loader, the configuration information, determining, by the OS boot manager, that a configuration of the information handling system indicated by the configuration information is incompatible with an OS loaded on the information handling system by the OS boot manager, determining, by the OS boot manager, that the incompatibility can be mitigated by changing a setting of the information handling system, changing, by the OS boot manager, the setting in response to determining that the incompatibility can be mitigated, and launching, by the OS boot manager, the OS in response to changing the setting.

19 Claims, 3 Drawing Sheets

SYSTEM AND METHOD FOR DYNAMICALLY CHANGING SYSTEM BEHAVIOR BY MODIFYING BOOT CONFIGURATION DATA AND REGISTRY ENTRIES

FIELD OF THE DISCLOSURE

This disclosure generally relates to information handling systems, and more particularly relates to dynamically changing system behavior by modifying boot configuration data and registry entries.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
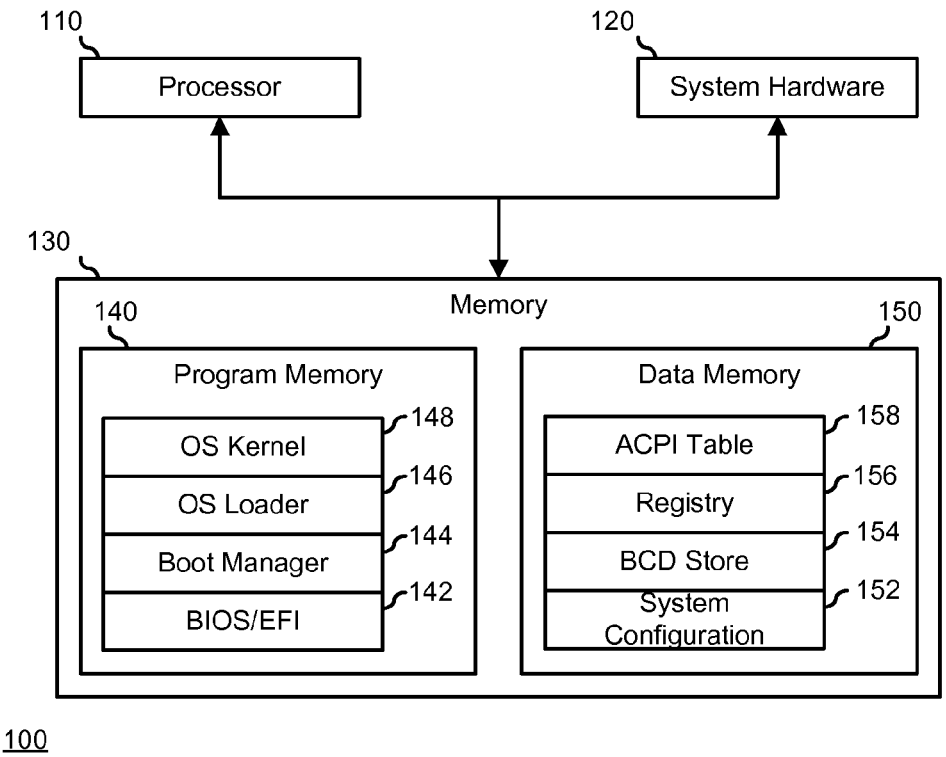
FIG. 1 is a block diagram illustrating an information handling system according to an embodiment of the present disclosure.

FIG. 1 illustrates an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a processor 110, system hardware 120, and a memory 130. Processor 110 operates to execute machine-executable code to provide the functionality of information handling system 100, such as the booting of the information handling system, launching and running an operating system (OS) or virtual machine manager on the information handling system, running applications on the information handling system, another function of the information handling system, or a combination thereof. An example of processor 110 includes an Intel Architecture (IA) processor such as an Intel processor, an AMD processor, or another IA processor, an ARM processor, an embedded processor or SoC, or another processor, as needed or desired. System hardware 120 represents the components provided in information handling system 100, such as a graphics adapter, an audio system, memory system, an I/O system, a peripheral device, another component, or a combination thereof.

Memory 130 includes program memory 140 and data memory 150. Program memory 140 includes a BIOS/EFI 142, a boot manager 144, an OS loader 146, and an OS kernel 148. Data memory 150 includes system configuration information 152, a Boot Configuration Data (BCD) store 154, a registry 156, and an Advanced Configuration and Power Interface (ACPI) table 158. BIOS/EFI 142 represents boot firmware built into information handling system 100 that operates to perform a power-on self test (POST) that identifies and initializes the components of system hardware 120. In particular, when information handling system 100 is booted, BIOS/EFI 142 determines the presence of the components of system hardware 120, and performs configuration operations on the system hardware. For example, BIOS/EFI 142 can determine a size of memory 130, initialize the memory, and allocate portions of the memory to various functions of information handling system, 100 such as for shadowing BIOS code from a non-volatile memory location to a location in a RAM. Further, BIOS/EFI 142 determines status information related to the booting of information handling system 100, and performs different configuration operations, depending upon the status information. For example, BIOS/EFI 142 can determine that the present boot cycle is part of an OS installation, a suspend operation from a sleep or hibernation state, another boot status, or a combination thereof, and in response the BIOS/EFI can determine that one or more configuration operations need to be performed or eliminated, or that the order of the configuration operations needs to be changed. In a particular embodiment, BIOS/EFI 142 creates and stores system configuration information 152 that describes the components of system hardware 120 and related configuration settings that are applied to the components in the process of the POST. An example of BIOS/EFI 142 includes a commercial BIOS in accordance with a BIOS Boot Specification, such as an Award BIOS, an AMI BIOS, a Phoenix BIOS, or another commercial BIOS, a commercial Unified Extensible Firmware Interface (UEFI) in accordance with a UEFI specification, such as an AMI UEFI, a Phoenix UEFI, an Insyde UEFI, or another commercial UEFI.

After BIOS/EFI 142 configures the components of information handling system 100, the BIOS/EFI starts boot manager 144 that operates to locate and launch OS loader 146, and accesses BCD store 154, described below, to pass system configuration information 152 to the OS loader. Boot manager 144 is configured independently from any OS that may be instantiated on information handling system 100, and can be used to launch multiple different OSs on the information handling system. For example, boot manager 144 can provide a boot screen that permits a user to select from among several OS into which to boot, or information handling system 100 can include a virtual machine manager, and the boot manager can be utilized to launch a different OS on each instantiated virtual machine. An example of boot manager 144 includes a bootmgr.exe file, a bootmgr.efi file, or another boot manager, as needed or desired. OS loader 146 operates to locate and initialize OS kernel 148, and prepares access to system hardware 120 before the OS kernel starts running OS loader 146 is configured in conjunction with the OS that is instantiated on information handling system 100. As such, if boot manager 144 includes options for more than one OS, then OS loader 146 represents multiple OS loaders, each associated with a different OS that can be installed on information handling system 100. An example of OS loader 146 includes a winload.exe file, a winload.efi file, a Linux Loader (LILO) boot loader, a Grand Unified Bootloader (GRUB) boot loader, or another boot manager, as needed or desired.

BCD store 154 is a database that includes boot-time configuration information associated with boot manager 144 and with OS loader 146. In particular, each of boot manager 144 and OS loader 146 are identified as objects within BCD store 154. Moreover, where each OS is identified with a different OS loader, BCD store 154 can include multiple objects, one for each different OS loader. BCD store 154 can include entries for each object that define various system hardware 120 functions. For example, BCD store 146 can include elements that define memory allocation within information handling system 100, that enable boot logging, that enable a kernel debugger, that limit I/O detection and operation, that determine a number of CPUs to enable, other hardware functions, or a combination thereof.

Registry 156 represents a hierarchical database that stores configuration settings and options for OS kernel 148, particularly when the OS kernel represents a Microsoft Windows type OS. Registry 156 includes settings for low-level OS components and applications running on information handling system 100. In a particular embodiment, registry 156 is utilized by OS kernel 148, device drivers, services, security managers, user interfaces, third party applications, other functions within the OS kernel, or a combination thereof. In addition, registry 156 provides access to counters for profiling the performance of information handling system 100. ACPI table 158 represents one or more tables that provide an interface between an ACPI-compliant OS, and system firmware, describing system hardware 120 in a system-independent manner.

In some situations, when BIOS/EFI 142 configures system hardware 120, various incompatibilities or inconsistencies can exist between the configuration of a component and a function of OS kernel 148 or a function specified by ACPI table 158. In a particular situation, the configuration of system hardware 120 is correct, but the programming of OS kernel 148, or a default configuration specified by one or more of BCD store 154, registry 156 and ACPI table 158 is incorrect. This inadvertent incompatibility can result in undesirable behavior of information handling system 100, such as an application hang or a system crash (i.e., a blue screen). For example, BIOS/EFI 142 can allocate a portion of memory 130 as a shadow memory are for BIOS/EFI code, and the size of the memory allocation can be large, such as 512 megabytes (MB), but OS kernel 148, assuming that the memory allocation is 128 MB, can allocate a portion of the 512 MB to other functions, such as to memory utilized to suspend information handling system 100 from a hibernation state. As a result, when information handling system 100 suspends from a hibernation state, BIOS/EFI 142 first allocates the 512 MB memory region as a shadow RAM, and then OS kernel 148 makes a memory call for resuming from the hibernation state to the shadow RAM. Here, when OS kernel 148 detects the memory contention (i.e., an illegal operation), the OS kernel may crash.

Figure 2:
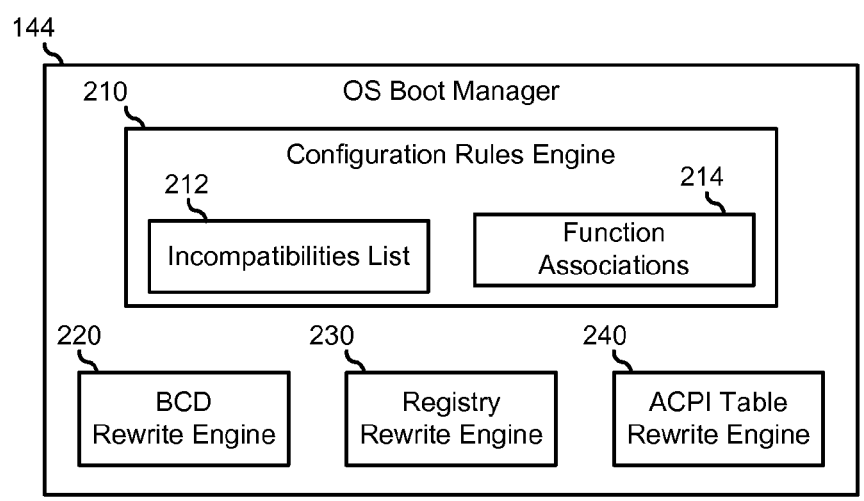
FIG. 2 is a block diagram illustrating a memory of the information handling system of FIG. 1.

FIG. 2 illustrates OS boot manager 144, including a configuration rules engine 210, a BCD rewrite engine 220, a registry rewrite engine 230, and an ACPI table rewrite engine 240. Configuration rules engine 210 includes an incompatibility list 212 that lists known incompatibilities and inconsistencies as described above, and a function association list 214 that lists features or functions that can be enabled, disabled, or changed within BCD store 154, registry 156, and ACPI table 158, in order to mitigate the ill effects of the incompatibilities and inconsistencies identified in the list. Configuration rules engine 210 receives system configuration information 152 from boot manager 144, and checks the system configuration information against incompatibilities list 212. If configuration rules engine 210 identifies no known incompatibilities or inconsistencies associated with system configuration information 152, then OS boot manager 144 proceeds to load OS kernel 148, and to pass operation of information handling system 100 to the OS kernel. If, however, configuration rules engine 210 identifies an incompatibility, then the configuration rules engine further identifies an associated feature of function that can be enabled, disabled, or changed within BCD store 154, registry 156, and ACPI table 158 to mitigate the ill effect of the incompatibility.

If the incompatibility can be remedied by enabling, disabling, or changing a feature or function within BCD store 154, then OS boot manager 144 invokes BCD rewrite engine 220 to edit the information in the BCD store to mitigate the ill effect of the incompatibility. Further, if the incompatibility can be remedied by enabling, disabling, or changing a feature or function within registry 156 or within ACPI table 158, then OS boot manager 144 invokes registry rewrite engine 230, or ACPI table rewrite engine 240 to edit the information in the registry or the ACPI table, respectively. Continuing the example from above, where BIOS/EFI 142 allocates 512 MB for a shadow RAM, and OS kernel 148 assumes that the memory allocation is 128 MB, configuration rules engine 210 can identify from system configuration information 152 that the BIOS/EFI has allocated 512 MB for the shadow RAM. This overlapping memory can be accessed during resume from hibernation, resulting in a system crash. Here, checking incompatibilities list 212 will result in a known incompatibility, and function associations list 214 can determine that the incompatibility can be mitigated by disabling hibernation in one or more of BCD store 154, registry 156, or ACPI table 158. OS boot manager 144 can then invoke the appropriate rewrite engine 220, 230, or 240 to disable hibernation. After OS boot manager 144 resolves the identified incompatibilities and inconsistencies, the OS boot manager proceeds to invoke OS loader 146 which in turn loads OS kernel 148, and to pass operation of information handling system 100 to the OS kernel.

In another situation, the programming of OS kernel 148, and the default configurations for BCD store 154, registry 156 and ACPI table 158 are correct, and the configuration of system hardware 120 is incorrect. For example, an administrator of information handling system 100 can determine that an advantage is gained in the way that BIOS/EFI 142 configures the information handling system, and that the advantage outweighs an ill effect from the incompatibility. Here, incompatibilities list 212 identifies that the incompatibility based upon the mis-configuration identified in system configuration information 152, rather than on known incompatibilities or inconsistencies as describe above. Further, having determined that system configuration information 152 includes a mis-configuration, then configuration rules engine 210 further identifies an associated feature of function that can be enabled, disabled, or changed within BCD store 154, registry 156, and ACPI table 158 to mitigate the ill effect of the mis-configuration, as described above. In another embodiment, when configuration rules engine 210 identifies a mis-configuration, a prompt can be displayed on a display device of information handling system 100, requesting a user to confirm that the boot process is to proceed with enabling, disabling, or changing BCD store 154, registry 156, or ACPI table 158 to mitigate the ill effect of the mis-configuration, or to halt the boot process.

Figure 3:
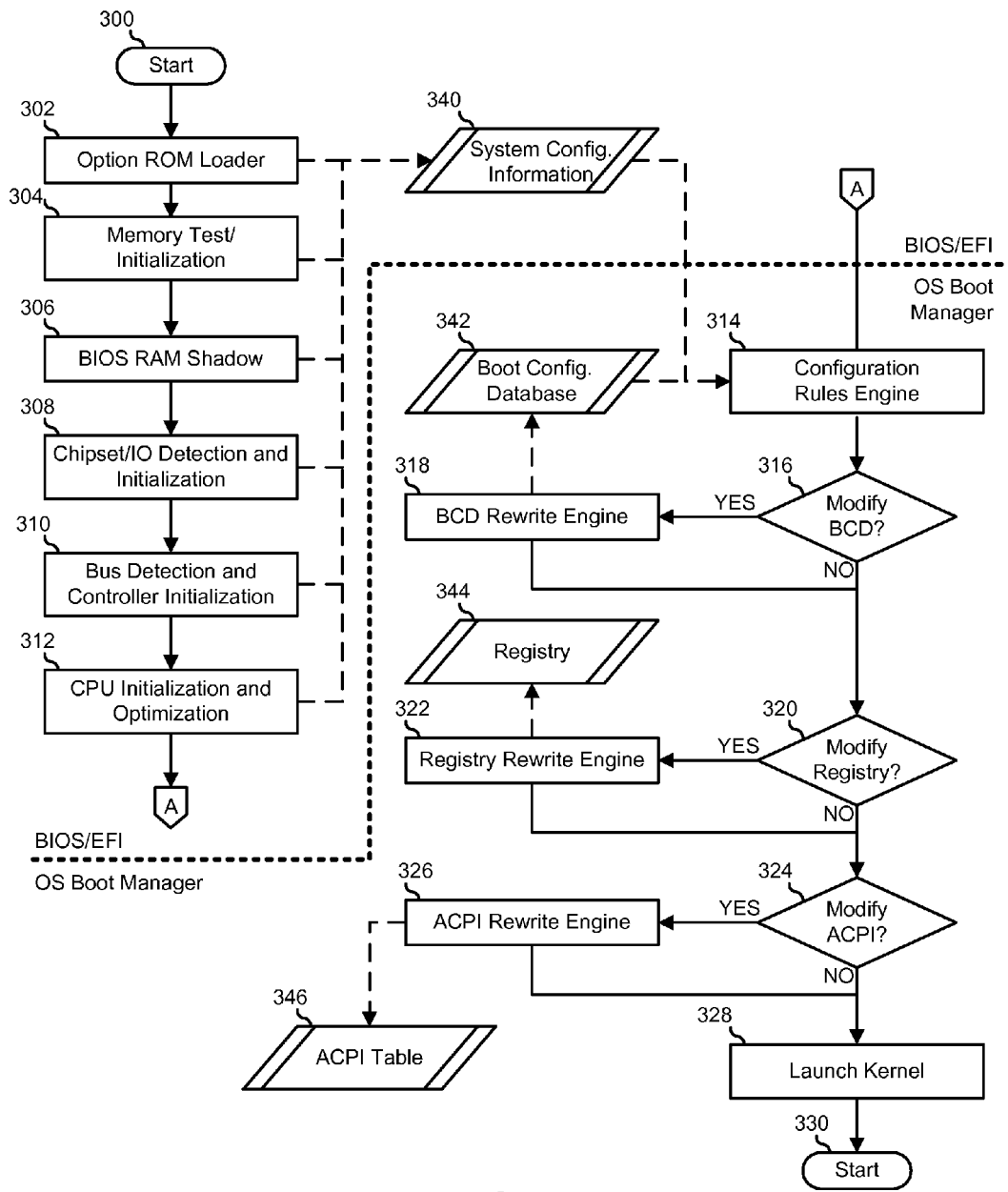
FIG. 3 is a flow chart illustrating a method of dynamically changing system behavior by modifying boot configuration data and registry entries according to an embodiment of the present disclosure.

In yet another situation, configuration rules engine 210 can determine that neither the configuration of system hardware 120, the programming of OS kernel 148, nor a default configuration specified by one or more of BCD store 154, registry 156 and ACPI table 158 is incorrect, but, based upon a boot status of information handling system 100, that a default configuration should be changed. For example, if system configuration information 152 indicates that the present boot cycle is part of an OS installation, configuration rules engine 210 can invoke one or more of rewrite engines 220, 230, and 240 to enable boot debugging or a kernel debugger. In a particular embodiment, boot manager 144 and OS loader 146 are configured as a single program element in program memory 140, and the functions of the OS loader are incorporated into the combined program element. In a particular embodiment, one or more of rewrite engines 220, 230, and 240 are implemented as a separate program element, such as a BCD editor, a configuration editor, a registry editor, another editor, or a combination thereof FIG. 3 a method of dynamically changing system behavior by modifying boot configuration data and registry entries starting at block 300. In the method, the steps performed in blocks 302 through 312, and the storing of information into a system configuration information database 340 are performed by a BIOS/EFI, such as BIOS/EFI 142, and steps performed in blocks 314 through 330, the retrieving of information into the system configuration information database, and the writing into a BCD 342, a registry 344, and an ACPI table 346 are performed by an OS boot manager, such as OS boot manager 144. An option ROM loader runs in block 302. The option ROM loader detects the presence of devices in an information handling system that include option ROMs, and shadows the option ROM data to assigned memory areas. In addition, the option ROM loader modifies system configuration information database 340 to reflect the presence of the devices identified by the option ROM loader, and any applicable configuration information for the devices. A memory test and initialization runs in block 304. The memory test and initialization detects the presence of memory in the information handling system, performs a memory test, and initializes the memory. System configuration information database 340 is modified by the memory test and initialization to reflect the size and status of the memory, and any other applicable configuration information for the memory.

A BIOS RAM shadow is created in block 306, the BIOS/EFI is copied from nonvolatile memory to the RAM shadow memory region, and the presence of the BIOS/EFI in the RAM shadow memory region is logged in system configuration information database 340. A chipset and the associated I/O for the information handling system are detected and initialized in block 308, and system configuration information database 340 is modified to reflect the chipset and I/O configuration and settings. I/O buses are detected and the bus controllers are initialized in block 310, and the I/O bus configurations and settings are written to system configuration information 340. Finally, the CPUs of the information handling system are initialized and optimized in block 312, and the CPU settings are written to system configuration information 340. Note that other BIOS/EFI configuration steps can be performed in accordance with the present embodiment, and that configuration, status, and settings information can be provided to system configuration information 340, as needed or desired.

When the BIOS/EFI POST is completed and system configuration information database 340 is updated and modified with the relevant information, the control of the information handling system is passed to the OS boot manager, and the method continues at block 314, where the system configuration information database and BCD 342 are retrieved by a configuration rules engine. The configuration rules engine compares the information with an incompatibilities list and a functional associations list to determine if the system configuration information is associated with any known incompatibilities or inconsistencies, if a boot status is indicated that is associated with a desired change in a default configuration, or if a mis-configuration is associated with a desired change in functionality in the information handling system. A decision is made as to whether or not the configuration rules engine has identified any modifications to BCD 342 in decision block 316. If not, the "NO" branch of decision block 316 is taken and the method proceeds to decision block 320. If BCD 342 needs to be modified, the "YES" branch of decision block 316 is taken, and a BCD rewrite engine modifies the BCD in block 318, and the method proceeds to decision block 320. A decision is made as to whether or not the configuration rules engine has identified any modifications to registry 344 in decision block 320. If not, the "NO" branch of decision block 320 is taken and the method proceeds to decision block 324. If registry 344 needs to be modified, the "YES" branch of decision block 320 is taken, and a registry rewrite engine modifies the registry in block 322, and the method proceeds to decision block 324. A decision is made as to whether or not the configuration rules engine has identified any modifications to ACPI table 346 in decision block 324. If not, the "NO" branch of decision block 324 is taken and the method proceeds to block 328. If ACPI table 346 needs to be modified, the "YES" branch of decision block 324 is taken, and an ACPI table rewrite engine modifies the ACPI table in block 326, and the method proceeds to decision block 328. An OS kernel is launched in block 328, and the method ends in block 330.

Figure 4:
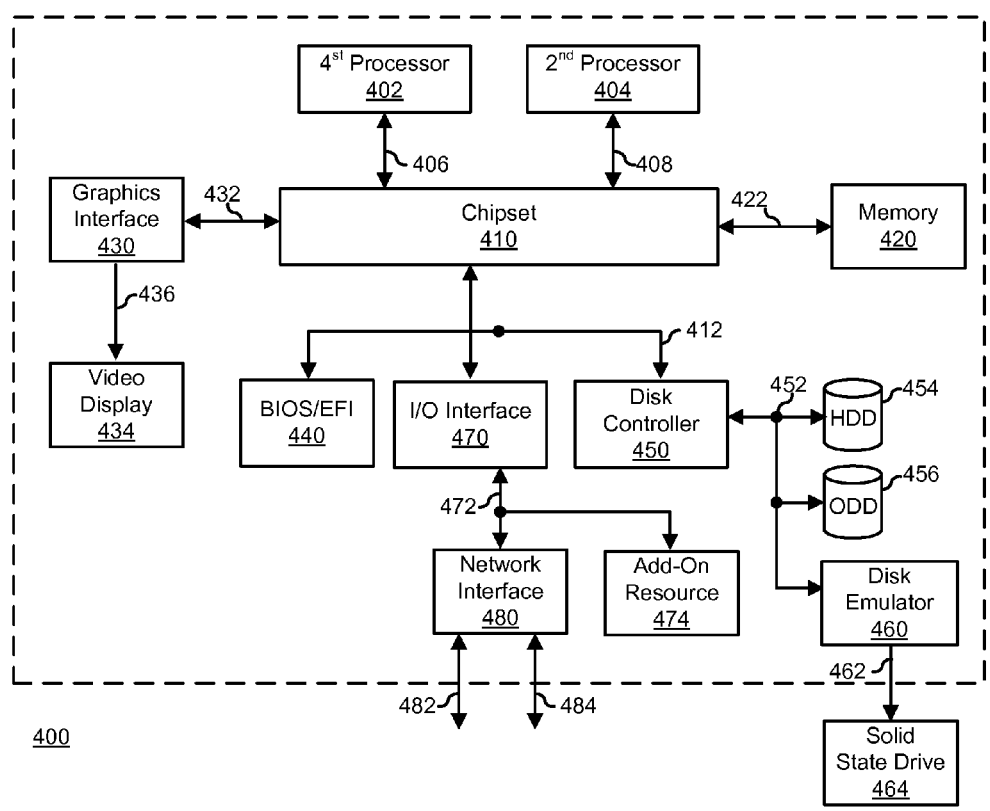
FIG. 4 is a block diagram illustrating a generalized information handling system according to an embodiment of the present disclosure.

FIG. 4 illustrates a generalized embodiment of information handling system 400. Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be coupled to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474 and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
  booting an information handling system;
  starting a basic input/output system (BIOS) in response to booting the information handling system;
  storing, by the BIOS, configuration information for the information handling system;
  retrieving, by an operating system (OS) boot manager, the configuration information;
  determining, by the OS boot manager, that a first configuration of the information handling system indicated by the configuration information is incompatible with an OS loaded on the information handling system by the OS boot manager, wherein the determining further includes checking for the first configuration in an incompatibilities list of the OS boot manager;
  determining, by the OS boot manager, that the incompatibility can be mitigated by changing a first setting of the information handling system;
  changing, by the OS boot manager, the first setting in response to determining that the incompatibility can be mitigated;
  determining, by the OS boot manager, that a second configuration of the information handling system indicated by the configuration information is not incorrect, and is associated with a boot status of the information handling system;
  changing, by the OS boot manager, a second setting associated with the second configuration of the information handling system; and
  launching, by the OS boot manager, the OS in response to changing the first setting.

2. The method of claim 1, further comprising:
  determining, by the OS boot manager, that a third configuration of the information handling system indicated by the configuration information is a mis-configuration of the information handling system;
  determining, by the OS boot manager, that the mis-configuration can be offset by changing a third setting of the information handling system; and
  changing, by the OS boot manager, the third setting in response to determining that the mis-configuration can be offset.

3. The method of claim 1, further comprising:
  determining, by the OS boot manager, that the booting of the information handling system is responsive to an installation of the OS; and
  changing, by the OS boot manager, a second setting in response to determining that the booting is responsive to an installation of the OS.

4. The method of claim 1, wherein changing the first setting comprises enabling a feature of the information handling system.

5. The method of claim 1, wherein changing the first setting comprises disabling a feature of the information handling system.

6. The method of claim 1, wherein changing the first setting comprises changing a boot configuration database of the information handling system.

7. The method of claim 1, wherein changing the first setting comprises changing a registry of the OS.

8. The method of claim 1, wherein changing the first setting comprises changing an ACPI table of the information handling system.

9. An information handling system comprising:
  a processor; and
  a memory including code for implementing:
    a basic input/output system (BIOS) operable to:
      initialize the information handling system; and
      store a configuration database including configuration information for the information handling system; and
    an operating system (OS) boot manager operable to:
      retrieve, by an operating system (OS) loader, the configuration information;
      determine that a first configuration of the information handling system indicated by the configuration information is incompatible with an OS loaded on the information handling system by the OS boot manager;
      determine that the incompatibility can be mitigated by changing a first setting of the information handling system;
      change the first setting in response to determining that the incompatibility can be mitigated;
      launch the OS in response to changing the first setting;
      determine that a second configuration of the information handling system indicated b the configuration information is not incorrect, and is associated with a boot an installation of the OS;
      determine that the booting of the information handling system is responsive to an installation of the OS; and
      change a second setting associated with the second configuration in response to determining that the booting is responsive to an installation of the OS, wherein changing the second setting includes enabling an OS kernel debugger.

10. The information handling system of claim 9, wherein the OS boot manager is further operable to:
  determine that a second configuration of the information handling system indicated by the configuration information is a mis-configuration of the information handling system;
  determine that the mis-configuration can be offset by changing a second setting of the information handling system; and
  change the second setting in response to determining that the mis-configuration can be offset.

11. The information handling system of claim 9, wherein in changing the first setting, the OS boot manager is further operable to enable a feature of the information handling system.

12. The information handling system of claim 9, wherein in changing the first setting, the OS boot manager is further operable to disable a feature of the information handling system.

13. The information handling system of claim 9, wherein in changing the first setting, the OS boot manager is further operable to change a boot configuration database of the information handling system.

14. The information handling system of claim 9, wherein in changing the first setting, the OS boot manager is further operable to change a registry of the OS.

15. The information handling system of claim 9, wherein in changing the first setting, the OS boot manager is further operable to change an ACPI table of the information handling system.

16. A non-transitory computer-readable medium including code for performing a method, the method comprising:
  booting an information handling system;
  starting a basic input/output system (BIOS) in response to booting the information handling system;

storing, by the BIOS, configuration information for the information handling system;

retrieving, by an operating system (OS) boot manager, the configuration information;

determining that a first configuration of the information handling system indicated by the configuration information is incompatible with an OS loaded on the information handling system by the OS boot manager, wherein the determining includes checking for the first configuration in an incompatibilities list of the OS boot manager;

determining that the incompatibility can be mitigated by changing a first setting of the information handling system;

changing the first setting in response to determining that the incompatibility can be mitigated;

determining, by the OS boot manager, that a second configuration of the information handling system indicated by the configuration information is not incorrect, and is associated with a boot status of the information handling system;

changing, by the OS boot manager, a second setting associated with the second configuration of the information handling system; and launching the OS in response to changing the first setting.

17. The computer-readable medium of claim 16, further including code for:

determining that a third configuration of the information handling system indicated by the configuration information is a mis-configuration of the information handling system;

determining that the mis-configuration can be offset by changing a third setting of the information handling system; and changing the third setting in response to determining that the mis-configuration can be offset.

18. The computer-readable medium of claim 16, further including code for:

determining that the booting of the information handling system is responsive to an installation of the OS; and changing a second setting in response to determining that the booting is responsive to an installation of the OS.

19. The computer-readable medium of claim 16, wherein changing the first setting comprises enabling a feature of the information handling system.

* * * * *